Feb. 10, 1953  A. M. CASTELL  2,627,631
CARDING METHOD AND APPARATUS
Filed Jan. 15, 1949  7 Sheets-Sheet 1

INVENTOR
AGUSTIN MASALLERA CASTELL
BY
AGENT

Feb. 10, 1953 A. M. CASTELL 2,627,631
CARDING METHOD AND APPARATUS
Filed Jan. 15, 1949 7 Sheets-Sheet 2

INVENTOR
AGUSTIN MASALLERA CASTELL
BY
Fritz C. Hochwald
AGENT

Feb. 10, 1953 A. M. CASTELL 2,627,631
CARDING METHOD AND APPARATUS
Filed Jan. 15, 1949 7 Sheets-Sheet 3

INVENTOR
AGUSTIN MASALLERA CASTELL
BY
AGENT

Feb. 10, 1953     A. M. CASTELL     2,627,631
CARDING METHOD AND APPARATUS

Filed Jan. 15, 1949     7 Sheets-Sheet 4

*INVENTOR.*
AGUSTIN MASALLERA CASTELL
BY

AGENT

Feb. 10, 1953 A. M. CASTELL 2,627,631
CARDING METHOD AND APPARATUS
Filed Jan. 15, 1949 7 Sheets-Sheet 5
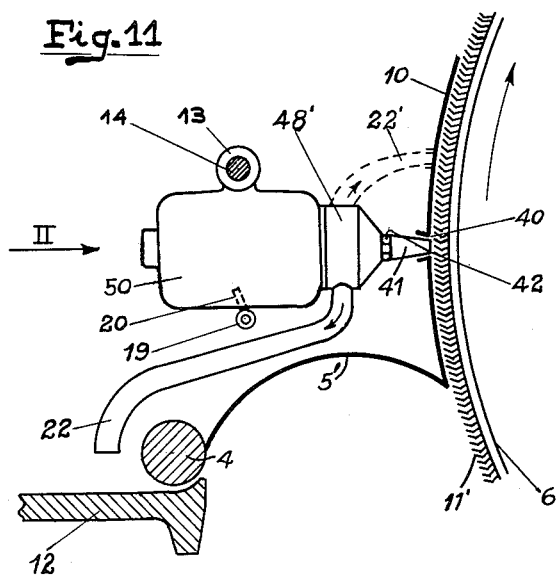
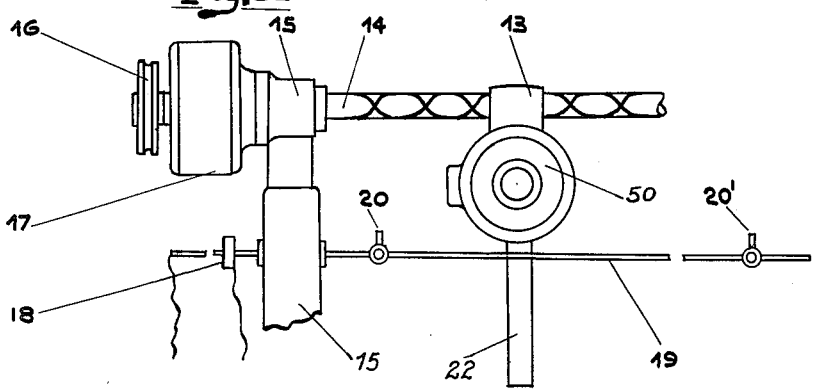
INVENTOR
AGUSTIN MASALLERA CASTELL
BY
AGENT

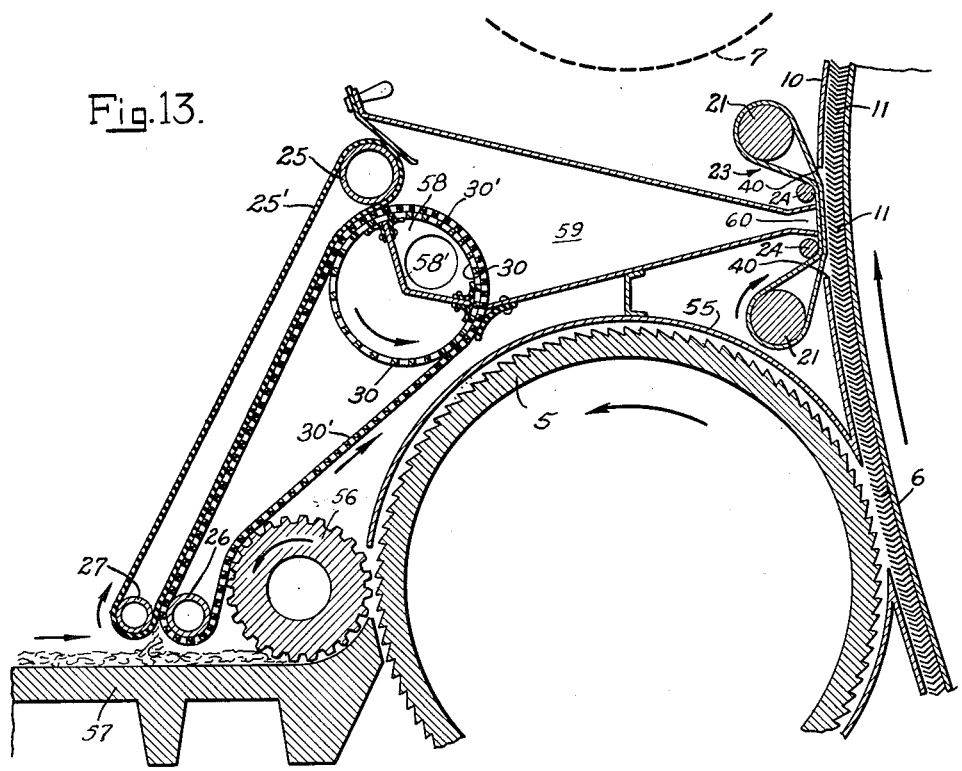

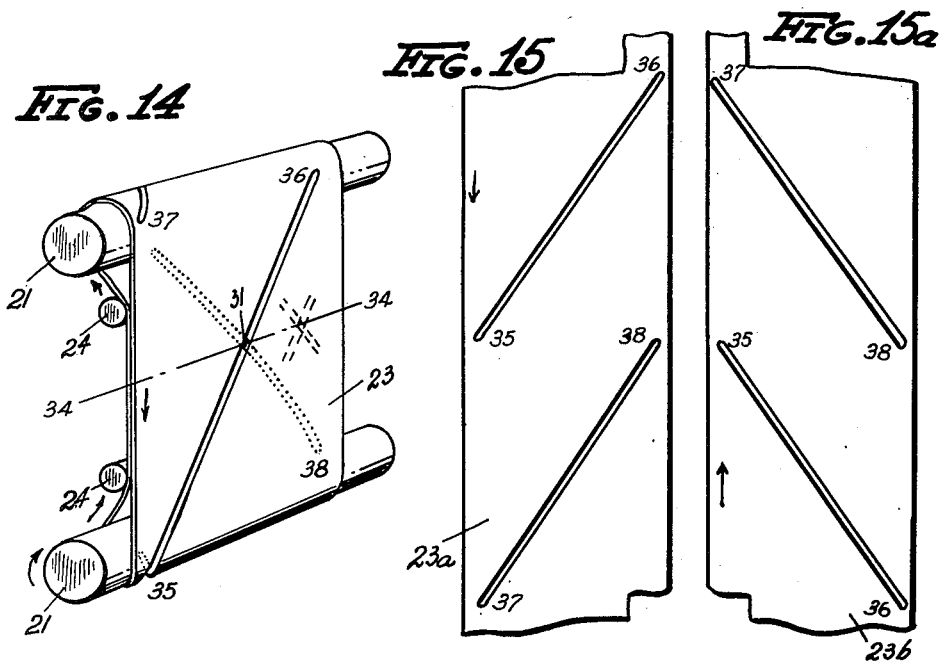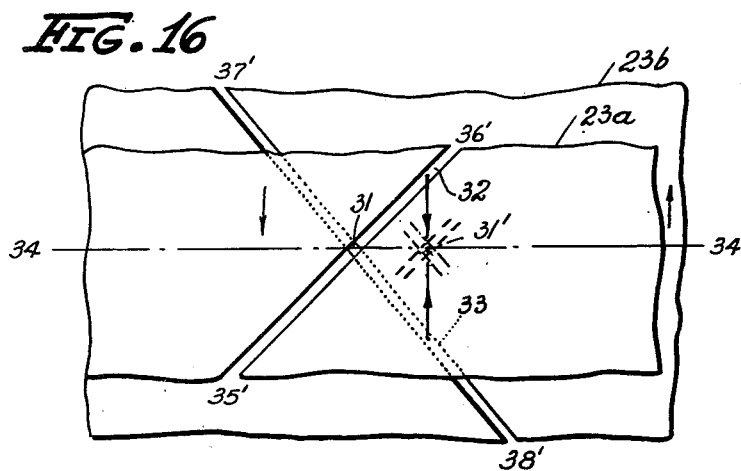

Patented Feb. 10, 1953

2,627,631

UNITED STATES PATENT OFFICE 2,627,631

CARDING METHOD AND APPARATUS

Agustin Masallera Castell, Barcelona, Spain, assignor to C. A. Constant Card, a corporation of Spain Application January 15, 1949, Serial No. 71,147
In Spain May 16, 1944

19 Claims. (Cl. 19—98)

This application is a continuation-in-part of my co-pending application, Serial No. 589,002, filed April 18, 1945, now Patent No. 2,481,002.

The invention relates to a method and apparatus for an improved operation of carding machines, while avoiding the periodical stopping of the carding process and is particularly concerned with the improvement of the quality of the produced material and with increasing the efficiency and the productive capacity of the elements used in this process.

Heretofore, the operation of the ordinary carding machines has been discontinuous because the card clothing clogs during the carding operation, i. e. the fibers being carded penetrate in between the wires of the card clothing, some of them so deeply that they are not taken off by the doffer. During carding, these fibers build up at the base of the teeth and accumulate to such a degree that they do not leave enough free space at their tips to hold the fibers as required to perform a good carding action; in addition, such compacting of material through all the length of the wires affects their elasticity, all of which interferes with the efficiency of the carding operation and results in an unsatisfactory selection of the treated fibers and in the appearance of an excessive amount of "white points" in the produced web. Such "white points" are locks or tufts of fibers which have not been opened because of a deficiency in the coaction of the flats with the clogged card clothing of the main cylinder. Therefore, it has been necessary to extricate or remove the fibers which fill the bases of the teeth of the card clothing of the carding cylinder as soon as these fibers begin to interfere in an objectionable way with the carding action. This removal of the residual fibers has to be carried out every two to four hours, depending on the nature of the raw material and the desired quality of the end product.

During each carding cycle, the carding conditions change continuously, which affects the quality and uniformity of the obtained sliver; this is objectionable for the subsequent spinning operation.

When the card clothing is clean, i. e. after it has been stripped, it absorbs a considerable amount of fibers which cannot be absorbed when the card clothing is filled; the result is that in the latter condition, the carding cylinder gives off to the doffer, as well as eliminates through the flats, a greater amount of fibers with less selection because of the deteriorating conditions under which the carding operation is being performed when stock gradually builds up on the card clothing of the main carding cylinder. These deteriorating conditions have the effect that:

1. The number of the produced sliver decreases and interferes with the continuous uniformity of the sliver required by the spinning process. (The term "number" is a figure inversely proportional to the weight of the fibers contained in a unit of the length of the sliver).

2. Since the free space between the teeth of the card clothing is progressively reduced by clogging, the fibers become each time deeper embedded in the flat clothing (in standard carding machines, the flats are constantly kept clean by continuous stripping) until a time arrives where the most deeply embedded fibers are no longer subjected to the carding action of the teeth of the card clothing and remain at the base until they are stripped with the short fibers and go into the waste, which in this way is increased and contains material amounts of long fibers. In addition to the loss of good fibers, this contributes to continuous changes in the quality and weight of the sliver.

Theoretically these drawbacks may be somewhat alleviated when the card clothing is stripped in regular and frequent intervals by skilled and conscientious workmen. However, since this kind of stripping work is unpleasant, particularly because of the development of dust accompanying this work, there is in practice an unavoidable tendency to put off the stripping operation and to perform it rather superficially; the result is that the fibers filling the base of the teeth are being gradually compacted, which renders their withdrawal very difficult.

The final very objectionable result is that the produced web shows an excessive number of "white points" which cause discontinuity in the yarn and are responsible for frequent breaks of the thread and stopping of the spinning operation.

To avoid the drawbacks inherent in the intermittent stripping of carding cylinders, it has been proposed to strip the card clothing intermittently by applying suction automatically and successively to limited areas of the clothing without interrupting the carding operation. These methods, however, are difficult to carry out in practice; they introduce other irregularities in the number of the obtained slivers and produce very considerable amounts of waste. This waste contains a large proportion of good fibers in a depreciated state, which cannot be utilized as such but have to be sold at the low price obtainable for the waste.

Some of these disadvantages are obviated by a process which consists in continuously applying suction to the web of fibers being carded on the carding cylinder, such suction being applied progressively back and forth across the surface of the cylinder as said cylinder rotates, the suction being sufficient only to raise the fibers from the base of the teeth to the tips thereof, without complete removal and carrying away of such fibers, whereby the major portion of the fibers remains on the carding cylinder and travels along therewith for completion of the carding operation, and whereby the clothing of the cylinder is kept continuously clear for long periods of time.

This process is described and claimed in my co-pending application Ser. No. 589,002, now Patent 2,481,002. A preferred apparatus for carrying out this process is described and claimed in another co-pending application, Serial No. 764,222 filed July 28, 1947, now Patent 2,507,141.

The principal object of this invention is to provide a method and apparatus for insuring a uniform carding operation in carding machines and for obtaining a sliver which, over long periods of time, is uniform as to quality and weight.

Another object of the invention is to provide a method to reduce the waste in general, and particularly to avoid removal of useful long fibers by the flats, or in the form of strippings.

Still another object of the invention is to provide a method and means to insure that the "white points" in the produced web are maintained far below a number as high as to affect the quality of the produced sliver.

Another object of the invention is to provide a method for avoiding the loss of good fibers during the carding action.

Other objects and advantages will be apparent from consideration of the specification and claims.

The method of this invention consists in a complete or partial removal by suction of the fibers which fill each element of the card clothing and in returning them to the tips of the teeth of the card clothing. Before being returned, the fibers may be subjected to a cleaning and selecting process and/or be separated from foreign matter. The removal and return of the fibers is carried out successively for each element of the card clothing in such a way that the withdrawals from, and additions to, the mat of fibers traveling on the card clothing do not produce any material discontinuity in the weight of the fibers which leave the machine per unit of time, however small such unit is taken. Therefore, the invention consists in a method and apparatus for continuously or continually withdrawing the fibers from the card clothing of carding machines and for continuously or continually adding at suitable times and points substantially uniform amounts of fibers in such a way that such withdrawals and additions compensate each other along each generatrix of the carding cylinder or that at least all generatrices carry the same amount of fibers when they are subjected to the action of the doffer, preferably before they reach the flats.

In order that the invention may be better understood, the conventional carding operation is graphically represented and compared with the process of my invention in the accompanying diagrammatical drawings, in which the various steps are shown in an arbitrarily varying scale in order to bring out the critical differences of the compared methods. Those steps of the compared methods which correspond to each other are, however, shown in their approximately true numerical relationship.

In these diagrammatic graphs,

Fig. 9 illustrates the uniformity of the web of fibers obtained by a continual intermittent operation according to the invention.

Fig. 11 is a partial elevational view of the rear portion of a carding machine with another form of apparatus in its operative position.

Fig. 12 is a side view of the apparatus of Fig. 11 viewed in the direction of the arrow II of Fig. 11.

Fig. 13 is an elevational view of still another apparatus which is suitable to perform the method of the invention, continuously or intermittently.

Fig. 14 is a perspective view of the suction shifting means of Fig. 13 on a somewhat larger scale (viewed from the carding cylinder);

Fig. 15 and Fig. 15a show developments of the slotted belt, viewed from the main cylinder side; and Fig. 16 is a plan view of the superposed runs of the belt, parts broken away.

Figure 1:
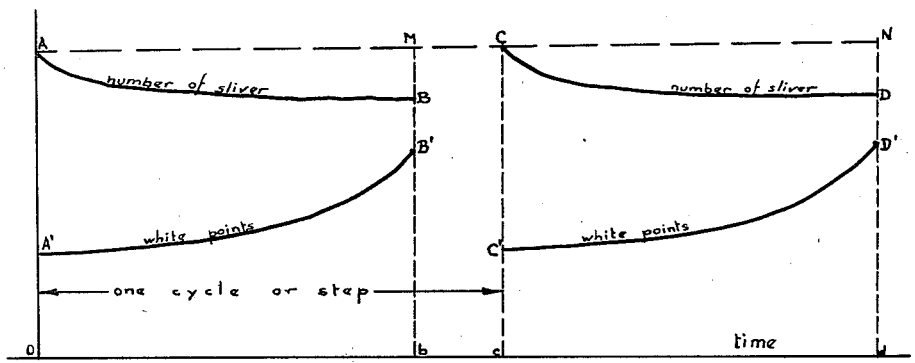
Fig. 1 shows the number of the sliver and the number of white points as functions of the carding time for the conventional carding process.
Figure 3:
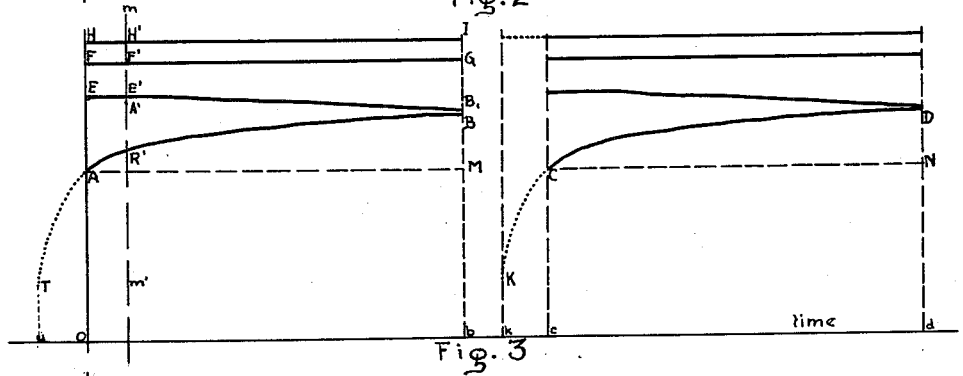
Fig. 3 shows the working cycle of a conventional carding machine.

The graph of Fig. 1 shows the number of the produced sliver and the number of white points as functions of the carding time in two successive steps or cycles of the conventional carding operation. The discontinuous line AB—CD . . .

represents the number of the sliver, the discontinuous line A'B'—C'D' . . . the number of white points. As readily seen from an inspection of the graph, the number of white points (lines A'B'—C'D' . . . ) increases in the conventional carding process so quickly that after about three hours of continuous running, at the times $b, d, \ldots$ the web has such a poor quality that the feeding of the carding machine has to be stopped and the carding operation is interrupted for cleaning the card clothing—the conventional intermittent stripping action. In this conventional intermittent stripping method, the feeding of the carding machine is resumed after the stripping time which is indicated in Fig. 3 by the abscissa $bk$, but the productive carding operation is not resumed at this moment because of the emptiness of the clean card clothing at this start of the carding operation. In this empty state, a large amount of fibers penetrates so deeply to the base of the teeth that the doffer cannot catch them, which results in the first moments ($kc$ of Fig. 3) of resuming the work of the carding machine in a web of an excessively reduced density with so much lower consistency that it cannot be used to produce the sliver. After a short time, these lacks or defects of fibers decrease until at the time $c$ the web can be used again to produce good sliver, which is tied to the one that was produced at the time just before stopping the feed of the machine. The next three-hour period shows lines CD and C'D' corresponding to the lines AB and A'B', and this cycle is repeated almost every three hours.

This means that in the conventional carding operation the number of the sliver is periodically raised to points A, C, . . . and the number of white points increases periodically to points B'D' . . . As stated hereinbefore, the number of white points is a measure for the efficiency of the carding operation, a high number of white points designating poor quality of the obtained sliver. The number of the sliver is inversely proportional to the density of the web, a higher number designating a sliver of lower density. Further, the points A, C, . . . indicate that periodically a sliver of lower density is obtained, and these points of low density define periodically occurring weaker points in the sliver which determine the quality and overall strength in the produced yarn.

This drawback of the conventional carding methods will be discussed more in detail with reference to Fig. 3.

Also, from another point of view, the line AB—CD . . . indicates unsatisfactory results of the conventional carding method. As already stated, the number of the sliver is inversely proportional to the weight, i. e. to the amount of the fibers constituting a unit of length of the web. If we draw through the points of the highest number, i. e. of lowest fiber amount A, C, . . . a parallel to the time axis, it will be noted that the areas AMB, CND . . . define conditions in which a greater amount of fiber goes into the web. However, this whole amount of additional fibers does not contribute to the final strength of the obtained yarn, because that strength is controlled by the weakest points defined by the points A, C, . . . of the highest sliver number. Therefore, in this conventional method, the strength of the part of the fibers of the sliver corresponding to the above-mentioned areas AMB, CND, . . . is wasted. Full efficiency of the quality of the used fibers is not obtained. In addition to these fibers which are being carded without actual benefit for the strength of the final yarn, waste is obtained in the form of the strippings from the card clothing; this waste contains a material proportion of useful fibers which have to be sold together with the short fibers. It has not been possible to reincorporate these fibers directly in the lap of fibers to be treated in the carding machine without destroying the homogeneity of the lap necessary to obtain a satisfactory sliver.

Figure 2:
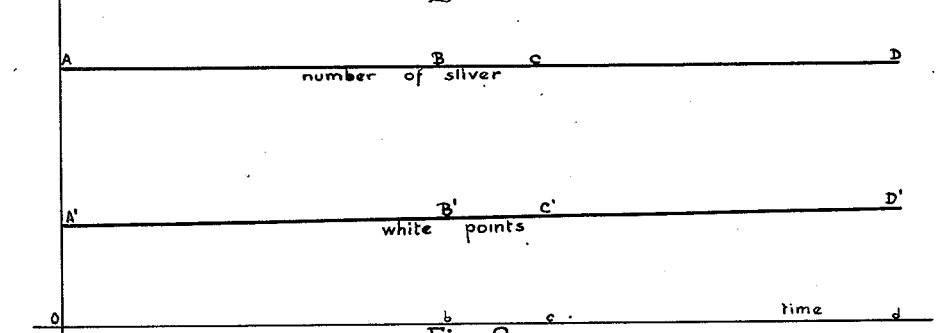
Fig. 2 is a graph corresponding to Fig. 1, showing the new process.

Fig. 2 shows correspondingly to Fig. 1 the number of the produced sliver and the number of the white points as functions of the carding time in the process of the invention. It will be seen that the number of white points, line A'D', increases so slowly that the carding process can be carried out continuously and for long periods of time without interruption; as a matter of fact, it is interrupted in practice only at the end of the work week, when the whole plant is shut down for the weekend, and cleaned, in order to remove seeds, leaves, and dirt, which may have become embedded in the teeth of the card clothing, and which are not taken off by the moderate suction normally used in the method of my invention. The line ABCD defines the number of the sliver; it is a straight line paralled to the time axis, which indicates that the machine delivers a constant uniform sliver. This sliver produces homogeneous yarn of equal strength over its whole length. A very short incubation period is caused by the completely empty card clothing at the start of the carding operation. In this empty state some fibers penetrate to the base of the teeth, which results, in the first moments of the carding operation, in a web of reduced density. After a short time, an equilibrium is reached and subsequently a web of uniform good density is produced for a long time.

It will be seen that in the case of Fig. 2, in contra-distinction of Fig. 1, no useless areas ABM, CDN . . . occur, which means that all the fibers being carded contribute equally to the uniform strength of the produced yarn.

The working cycle of a conventional carding machine in operation is shown in the graph of Fig. 3. In this figure the axis of abscissae represents again the time on the same scale as that of Figs. 1 and 2, but the ordinates represent the distribution of the fibers by weight at the various feed and delivery points. The line HI shows the theoretically constant feed from the picker lap which delivers an amount of fibers per unit of time represented by OH. The points of the curve AB (inverse to the curve AB of Fig. 1) represent the amount of fibers which at any time $t$ forms the web which finally builds up the sliver, and the distance between the points of this curve and the axis of the abscissae is a measure of the amount and of the weight of fibers used for this purpose at the corresponding time $t$.

The area ABIH represents the amount of fibers and foreign matter which is, during the carding operation, separated from the mat of fibers. This waste is composed as follows:

ABB$_1$E is the mass which clogs the main carding cylinder.

EFGB$_1$ is the material taken off by the flats.

FGIH represents the other sources of waste (under the main cylinder, under the licker-in, the strippings from the doffer, and the flyings).

As in Fig. 1, the point $b$ defines the moment when the feed of the carding machine is suspended for starting the stripping of the card clothing, and the point $c$ indicates the time when the web resumes the required density and the machine again produces useful sliver.

The graph of Fig. 3 shows clearly the working cycle of a conventional carding machine; it will be noted that the difference between $bB$ and $OA$ indicates the difference in the weight of fibers per unit of length of produced sliver when the card clothing is clean (time $O$) and immediately before the machine is stopped (time $b$) for stripping. As in Fig. 1, the area AMB represents the fibers which go into the sliver without increasing its strength; this strength is defined, as already stated, by the weakest point A. Therefore, this area AMB gives a measure of the amount of fibers in the web and sliver not contributing their maximum strength. The inclination of the curve $EB_1$ defines the increase in waste from the flats.

It will be seen that the distance between the curves $EB_1$ and AB decreases in the course of the carding operation whereby the difference in the ordinates of the curve $EB_1$ and AB is a measure of the weight of the fibers taken up by the carding cylinder per unit of time. This difference will become zero and the points B and $B_1$ will coincide when the card clothing is completely filled up; as under these conditions the produced product would be of very poor quality, the feed is stopped previously at the time $b$ when there is still a certain distance $BB_1$ between the curves AB and $EB_1$.

At the time $k$, the feed of the machine is resumed, but the sliver obtained during the time $kc$ cannot be used because, as stated hereinbefore, the web forming such sliver does not have the necessary density (its weight increases from $kK$ to $cC$) and because the number of such sliver would be too high and differ too much from that of the normally produced sliver. Only at the time $c$ productive operation sets in again and a sliver is produced having the weight $cC$ equal to $OA$.

The method of this invention consists in establishing substantially uniform conditions throughout the carding operation. This is graphically shown by Fig. 4, where all lines of Fig. 3 have become substantially parallel to the time axis. Here again, the distance between the line AB and the time axis represents the amount of sliver producing fibers and the area between the axis of abscissae and the line HI the amount of fibers fed to the machine. The area between the lines $EB_1$, FG and the corresponding ordinates indicates the amount of waste removed by the flats, which is constant, as shown by the uniform distance between these two lines. The total other waste is similarly indicated by the area comprised between the lines FG, IH and the ordinates.

The distance between the lines AB and $EB_1$ indicates the amount of seeds, dirt, and the like embedded in the teeth of the card clothing, the extraction of which requires a higher vacuum than that ordinarily used.

Figure 4:
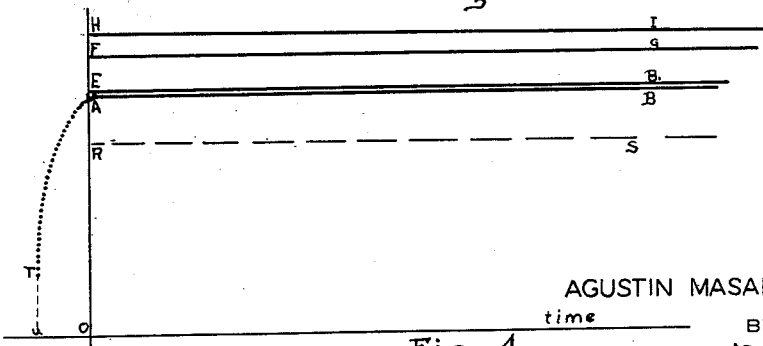
Fig. 4 is a corresponding graph for a machine operated according to the invention.

The improved carding process due to the method of this invention could be defined in Fig. 3 by a line $mm'$ parallel to the axis of ordinates in which the points H', F', E' and A' correspond to the points H, F, E and A of Fig. 4, whereby the distance $R'A'$ indicates the recycled amount according to the lines RS of Fig. 4.

A comparison of the graphs of Figs. 3 and 4 shows that the method of this invention ensures (1) a sliver of uniform quality and number (lines parallel to the time axis), (2) a constant carding operation under the most favorable conditions (line $mm'$ in Fig. 3 close to the axis of ordinates), and (3) a reduction of waste to a minimum on the flats (line $E'F'$) as well as on the main cylinder (line $A'E'$).

Figure 5:
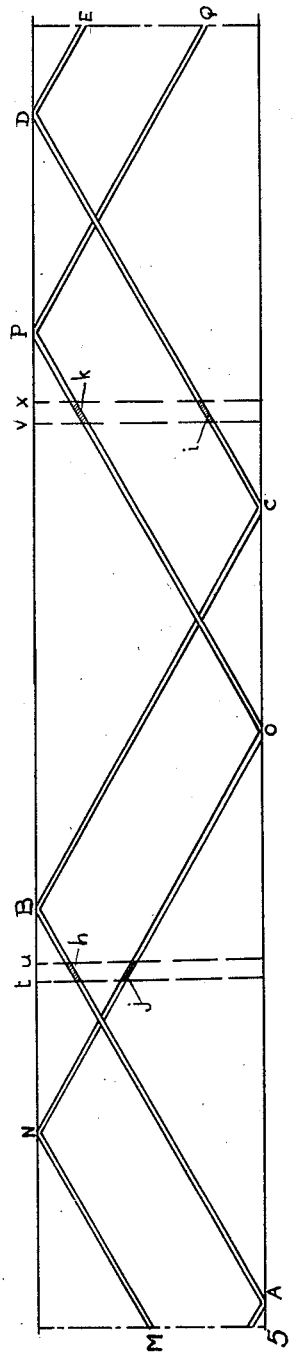
Fig. 5 is a devolution of the web of fibers traveling on the main carding cylinder and illustrates the method of the invention in its continuous realization.

In carrying out the method of the invention, the web of fibers traveling on the main carding cylinder is subjected to the continuous, constant and uniform action of one or more suction nozzles, which are uniformly reciprocated along a line close to the periphery of the card clothing of the cylinder and substantially parallel thereto, in such a way that the suction produces in the traveling web of fibers a helical path which, when developed in a plane gives one or more zig-zag paths defining lines of decreased fiber content; these developed paths form a constant angle with the generatrices of the cylinder and are represented by the lines ABCD of Fig. 5, in which the length of the development is drawn on a much larger scale than the width of the cylinder. Simultaneously with such suction, the fibers previously withdrawn from the card clothing are returned, constantly and uniformly, to the action of the carding cylinder in such a way that the additions produce a continuous path of constant angle with the generatrices of increased fiber content MNOPQ, which preferably, but not necessarily, conform to the line ABCD and run parallel thereto in an equal distance. Preferably all the fibers previously withdrawn are returned to the cylinder after foreign particles, such as dirt and the like have been removed.

The continuity and uniformity of the lines ABCD . . . (decreased fiber charge) and MNOP (increased fiber charge) is important because this will accomplish the uniformity of the produced web; at each time $t$ this web is composed of the good fibers which are continuously and uniformly fed to the machine from the picker lap (which is theoretically constant) minus those removed from the line ABCD . . . plus those which were incorporated along the line MNOP . . . .

The object of this invention may be attained either by a continuous method represented by lines ABCD and MNOPQ of whatever form and angle as shown in Fig. 5—provided the line of removal extends over the whole width of the carding cylinder—or by an intermittent method; in the latter case, however, the weights of the fibers fed to, and removed from, each generatrix during a revolution of the cylinder must be the same.

The graphs shown in Figs. 6-9 represent the working conditions for my intermittent method. Fibers are removed along certain circumferences or straight sections of the carding cylinder producing zones of a deficient fiber content, each of said zones constitutes a cylindrical element of small height (Z in Fig. 6) and produces in the development of the web carried by the cylinder an enlarged area of fiber deficiency represented by ABCD, EFGH, IJKL.

Such extractions of fibers will take place in each of the cylindrical elements constituting the carding cylinder.

According to the invention, these deficiencies are obviated by adding to a zone of those generatrices of the carding cylinder that are affected by the removal of fibers an amount of fibers equal to the removed amount and by carrying out these additions within the same revolution, i. e. removal and addition of fibers must take place between two consecutive passages of the involved generatrix by the doffer. Said additions are represented by the overcharges of fibers in the areas $A_1B_1C_1D_1$, $E_1F_1G_1H_1$, $I_1J_1K_1L_1$, ... which result in a continuous uniform sliver.

Figure 6:
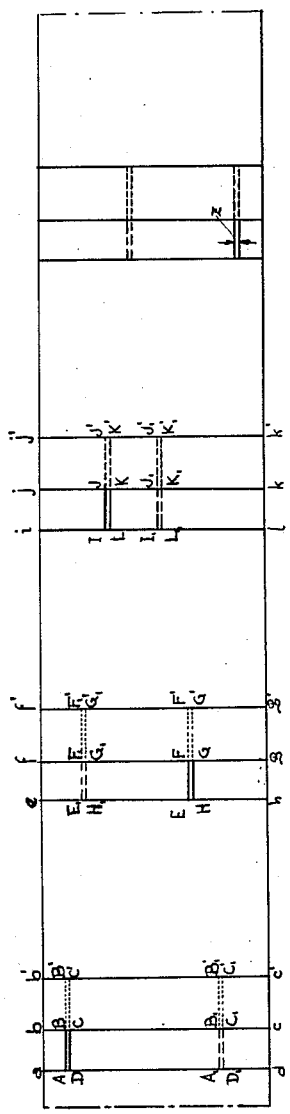
Fig. 6 is similar to Fig. 5 and illustrates an intermittent method according to the invention.
Figure 7:
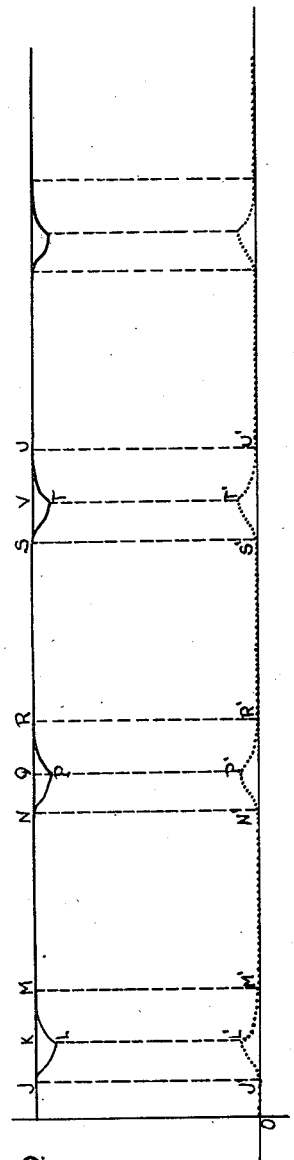
Fig. 7 illustrates graphically a carding cycle of an element of the card cloth, subjected to a suction according to the intermittent process of the invention.

In the graph of Fig. 7, I show separately the action of removing fibers as applied to any one of the areas ABCD, EFGH, ... of Fig. 6; all these areas have the same size, since they represent analogous conditions and are nothing else but elements of the cylinder under consideration of very small width. When such cylindrical elements are considered as independent units, one arrives at a working cycle similar to that shown in Fig. 3 for the stripping cycle of the entire cylinder. Therefore, the graph of Fig. 7 is, in principle, analogous to that of Fig. 3, but should be reduced to $1/n$ with respect to the ordinates because this cycle represents only $1/n$ of the width of the card clothing. With respect to the axis of abscissae, it has been assumed that both cycles take the same time.

Figure 7A:
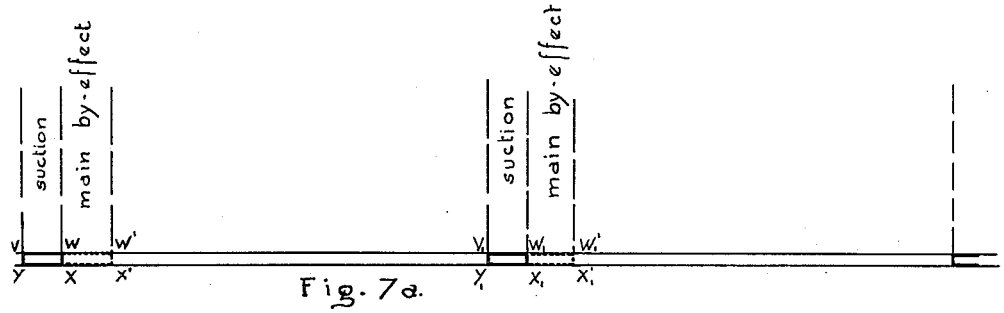
Fig. 7a shows a suction cycle of the element represented in Fig. 7.
Figure 7:
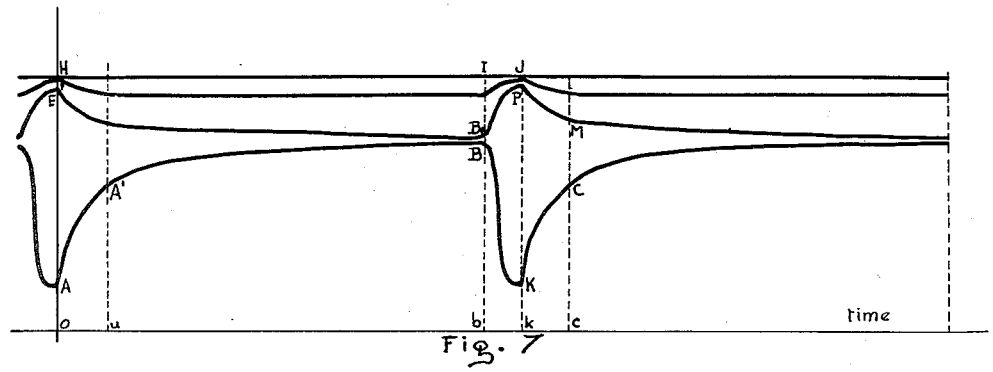

Fig. 7a represents the cylindrical element referred to hereinbefore, in a form as shown in Fig. 6, wherein the stripped area is indicated by VWXY. The distance XY defines the suction prior to O (Fig. 7). The immediate effect of such suction is illustrated in Fig. 7 during the time $Ou$, corresponding with area WW'X'X, which is characteristic of a reduced delivery of fibers (by effect). In the time interval $ub$, a more stable production of such element is again obtained, until at the time $b$ suction is again applied until time $k$, whereupon the same sequence of effects is produced as represented by the areas $V_1W_1X_1Y_1$ and $W_1W_1'X_1'X_1$ corresponding to VWXY and WW'X'X.

The time O defines now the moment when the stripping action has just cleaned the cylinder element under consideration.

Because of that stripping, and the consequent cleanliness of the card clothing, a relatively large part of the fibers enter in between the teeth of the card clothing; therefore, at first only a small part of these fibers is taken off by the doffer and the contribution of this element to the total produced web is very light. In the normal carding operation, as represented in Fig. 3, this first element, after stripping (KC or TA), is not used to produce sliver. Only after a certain lapse of time, $Ou$, a more normal density in the web produced by the element under consideration is obtained. Thereafter, the contribution by said element to the weight of the sliver produced per unit of time increases along the line A'B until the element is again stripped at the time $b$, whereupon a sharp decline of the weight of the web produced by the element sets in (for instance along the curve BK, the form of which will depend on the characteristics of the used method) and reaches a minimum $kK$ equal to OA at the moment when the stripping action disappears, whereupon the first working cycle starts for this same element again at $c$ corresponding to the first cycle starting at O.

The element under consideration is continuously charged with fibers (continuity of line HI), and the amount of fibers withdrawn from the carding action proper is not limited to the stripped fibers accumulated at the base of the teeth of the card clothing element under consideration and represented by the area $ABB_1E$, but is increased by the fibers corresponding to the area $BKPB_1$ which represents raw fibers charged during the stripping action and removed together with the strippings.

Figure 8:
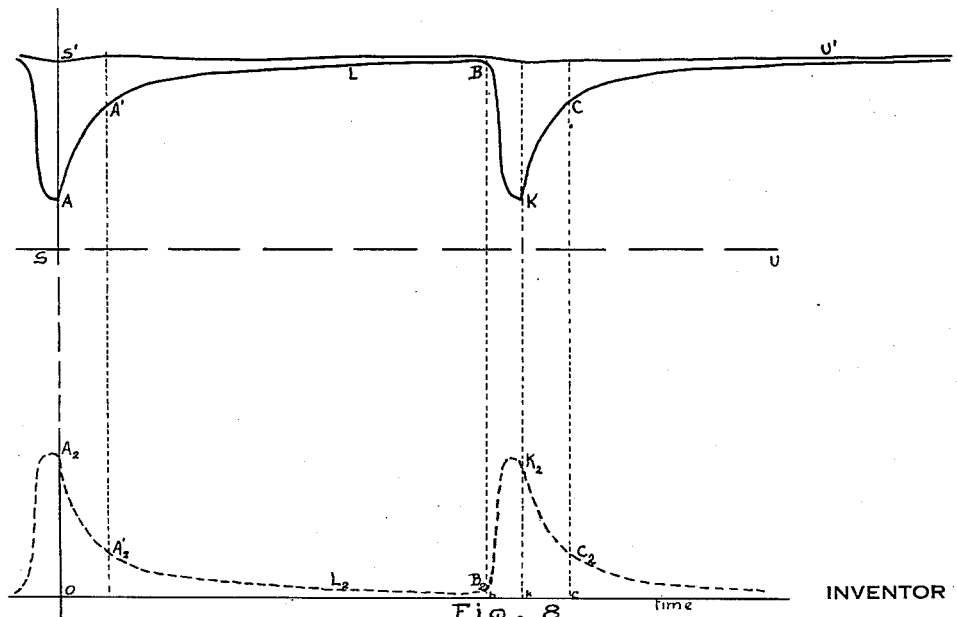
Fig. 8 shows the effect of the changes to which one element of the card clothing is subjected, according to Fig. 7, on the whole web of fibers, and the equalizing effect obtained according to the invention.

For a better understanding of the problems involved, it may first be assumed that the other elements of the card clothing except the one under consideration produce a sliver of constant weight per unit of time, represented by the line SU in Fig. 8, in which case the particular element considered in Fig. 7 will add certain weights defined by the line AA'BKC (Fig. 7); these amounts added to SU (Fig. 8) will give a line of sliver weight AA'LBKC, showing maximum irregularities at A, K, ....

These irregularities which would produce weak points in the sliver and control its strength are counterbalanced and avoided by additions, which for each generatrix should be substantially equal to the removal. This equality may be ensured by adding such amounts of fibers as removed at an analogous time $t$ of the working cycle (Fig. 7) from another element of the card clothing. In this way, whenever an amount of fibers is removed from the element of a generatrix, the same amount of fibers, previously removed from a corresponding element of another generatrix, is added to the tips of the teeth of an element of said first generatrix before reaching the doffer, preferably before it reaches the flats.

These amounts are added to areas corresponding to those represented by $A_1B_1C_1D_1$, $E_1F_1G_1H_1$, $I_1J_1K_1L_1$, ... (Fig. 6) comprised between the generatrices $ad$ and $bc$, $eh$ and $fg$, $il$ and $jk$ ... which enclose the elements of the card clothing from which fibers have been or will be removed. This addition is accompanied by by- or after-effects which correspond to those indicated by the areas $B_1B_1'C_1'C_1$, $F_1F_1'G_1'G_1$, $J_1J_1'K_1'K_1$, ... ; the by-effects are materially felt in an area extending to the generatrices $b'c'$, $f'g'$, $j'k'$, ... which are those that in Figs. 7 and 8 correspond to the time $c$.

For the element considered in Fig. 8, these additions and by-effects are indicated by the area enclosed by the time axis, the corresponding ordinates and the line $A_2A_2'L_2B_2K_2C_2$ (equivalent to the area between the lines AA'BKC ... and $EB_1$ PM ... of Fig. 7). When these fibers are added to a sliver corresponding to the form AA'BKC (Fig. 8), a line S'U' is obtained which is substantially equidistant from the time axis and indicates a substantially constant total weight of the sliver.

Actually the irregularities and their compensations, as explained hereinbefore, apply to each of the $n$ elements constituting the width of the card clothing. In the case of uncompensated fiber removal, the weight of the sliver as function of the time is represented by the line JLMNPRSTU ... of Fig. 9. Here the points L, P, T, ... more or less modified by the action of the flats, indicate weak points of the whole sliver corresponding to the points K or A (Figs. 7 and 8) of the single elements. These irregularities are compensated by the additions represented by the line J'L'M'N'P'R'S'T'U', which indicates the total of the elemental additions represented by the lines $A_2A_2'L_2B_2K_2C_2$ of Fig. 8.

It will be noted that the total result of all actions upon the successive cylindrical elements of the main carding cylinder is a line JKMNQRSVU ... for the weight of the produced sliver which is substantially parallel to the time axis and does not show any outstanding points which would indicate weak points. Therefore, all the fibers incorporated in the sliver contribute equally to its strength and the sliver is at all times of uniform quality and quantity.

The graphs of Figs. 1 to 9 show how the method of this invention avoids the waste and irregularities of the sliver inherent in the carding operations known heretofore. The graphs of Figs. 6 to 9 show, in addition, that a continuous carding process with continual intermittent stripping produces, without the method of this invention, more waste and a more irregular sliver than the continual carding and stripping operation.

The removal of the fibers from the card clothing is obtained by suction, which prevents any injury to the teeth of the card clothing, and avoids dust which depreciates the produced yarn. The suction may be so adjusted as to obtain a complete stripping of the card clothing or raise the fibers only from the base of the teeth of the card clothing to the tips thereof, without complete removal of the fibers, said latter method being described and claimed in my co-pending application Serial No. 589,002, now Patent No. 2,481,002.

The removal of the fibers may be carried out continuously or intermittently. I prefer the former method because it allows of using simpler apparatus. Material advantages of the continuous process are that it is not necessary to add fibers in an amount corresponding to the previously withdrawn amount for obtaining a uniform sliver—provided that these withdrawals and additions are uniform per se; in the intermittent process it would be necessary—as seen from Figs. 6 and 9—to insure that charges of fibers are always added to the same generatrix from which fibers were previously removed or will be removed, whereas in a continuous process, this compensation takes place automatically (Fig. 5). In the continuous method, there is at each moment an infinitesimal element in each of the elemental states defined by any one of the abscissae of Fig. 7, which insures mathematical continuity and uniformity. Further, in the continuous process, the actions on the card clothing are exerted along helical tracks, which may overlap each other to a certain extent; these tracks extend obliquely to the traveling direction of the card clothing, which facilitates the quick normalization of the working conditions on each element and each generatrix and results in a more even surface of the web. The new method is not restricted to the operation of the main carding cylinder but can be applied also or only to the doffer and other carding cylinders which may be used in textile machines.

Though the suction may be applied to the card clothing of the main carding cylinder at any point of its travel, I prefer to do it in the space between the licker-in and the flats, and to return the removed fibers to the lap of fibers before it goes into the licker-in, so as to subject those removed fibers to a second opening and cleaning treatment by the licker-in.

Applying the vacuum or suction to the card clothing between the licker-in and the flats has several advantages. It allows of an easy inspection of the apparatus used and of recycling and distributing the removed fibers in front of the licker-in by simple gravity. Since there is always the possibility that the suction loosens fibers in an area adjacent to the exact card clothing element to which the suction is applied, these fibers that have a higher proportion of short ones are subjected, before arriving at the doffer, to the action of the flats, which will eliminate the short fibers.

When applying my method in such a way that a substantial portion of the fibers is raised from the base of the teeth to the tips thereof only, there is a particular advantage in applying the suction between the licker-in and the flats, because the fibers raised from the base of the teeth contain a relatively high proportion of short fibers which are then acted upon and removed by the flats. In this way, it is avoided that the short fibers are pushed towards the base of the teeth and compacted again which would render their final removal very difficult.

Various apparatus for carrying out the method of this invention are shown by way of example in the accompanying drawings.

Figure 10:
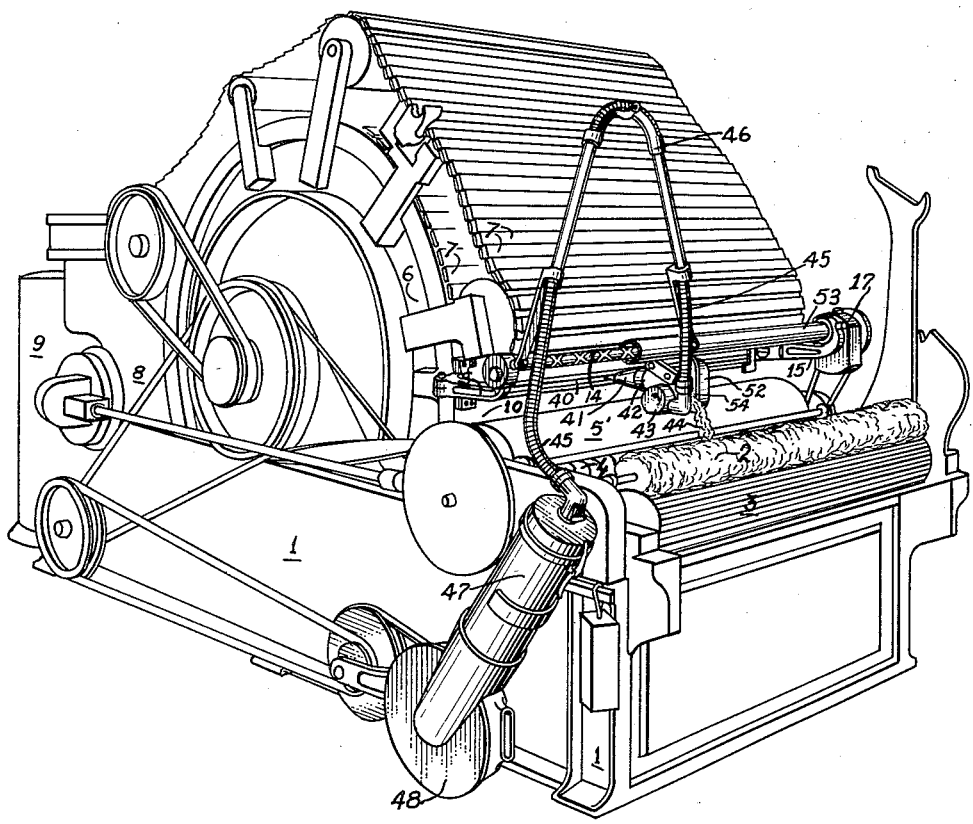
Fig. 10 is a perspective diagrammatic view of a typical cotton carding machine, provided with an attachment suitable for carrying out the method of this invention.

Fig. 10 shows a conventional cotton card in which the framework 1 supports the various elements of the machine, such as the lap roll 3 which delivers the lap 2 over the feed table to the feed roll 4. The lap of fibers enters then the licker-in, enclosed by the cover 5', from which the fibers are drawn by the card clothed surface of the main cylinder 6. The coaction of the periphery of this cylinder with the card clothed flats 7 that closely surround it, serves to separate the short fibers and foreign matter from the good fibers, which at the same time are arranged substantially parallel to each other. These carded fibers are removed from the carding cylinder by the card clothed doffer, located at 8, which delivers the fibers in sheet form (called web) to a trumpet from which it is drawn in the form of a sliver and collected in the roving can 9.

A slot 40 is provided in the cover 10 of the carding cylinder 6 between the licker-in and the flats 7. An adjustable suction nozzle 41 acts in this slot 40 from a convenient distance on the card clothing. The suction nozzle is carried by a body 42 which includes a suction chamber communicating through a filter 47 with a stationary aspirator 43 preferably associated with the card. The apparatus 42 is described more in detail in my co-pending application Serial No. 764,222, now Patent No. 2,507,141, and contains essentially a revolving drum divided by radial walls into longitudinal compartments; the drum is provided on its cylindrical face with a group of radial perforations for each of said compartments, means for pressing one end of said drum against the wall of the suction chamber 43, a suction port on said wall extending over a section corresponding to at least one compartment of said drum, a sealing packing at the other end of said drum, means for sealing the space between the lower part of said drum and the wall of the body 42, a rotatable roller mounted for rocking movement, and means for pressing said roller against the surface of the drum for the purpose of compacting the fibers sucked into the suction chamber by the suction nozzle 41 and collected in said drum and for expelling these fibers 44 through the opening 54. The fibers 44 fall then by simple gravity in the lap of fibers and are subjected again in a continuous process to the action of the licker-in and the other elements of the machine.

Air and dust carried by the air pass from the suction chamber on the body 42 through a flexible pipe 45 supported in a suitable manner at 46 to a filter chamber to where the dust is retained. The air is then sucked in by the centrifugal pump 48 driven from the machine itself by a pulley and belt drive.

The movable part of this mechanism—the collector—is mounted on a double-threaded rod 14 which, when rotated by the action of the pulley or over a special reducing gear 17, imparts to the collector a reciprocating movement from one to the other end of said rod and drives at the same time the gear mechanism in the housing 52 which drives the various parts of the collector in the body 42. This rod may be protected by a cover 53 and is maintained in its position parallel to the axis of the main carding cylinder by the supports 15 mounted on the frame 1 of the card.

Figs. 11 and 12 illustrate another apparatus for carrying out the invention. Also this apparatus is mounted at the rear part of the carding engine at the top of the cover 5' of the taker-in or licker-in, and in the space which remains between the licker-in and the curve formed by the flats. 15 illustrates one of the supports for the apparatus, 12 is the feed table, 4 the feed cylinder, 6 the main carding cylinder, 11' the points of the card clothing of the cylinder, and 10 the cover of the cylinder.

The apparatus itself is constituted essentially by a turbo-aspirator enclosed in the body or casing 48'. It is coupled directly to an electric motor 50 and has for inlet an aspiration or suction tube 42 which terminates in a mouth-piece or nozzle 41 which through a slot 40 provided over the whole length of the cover 10 of the card clothing of the main cylinder is located at a convenient distance from the points of such card clothing in order to withdraw the required fibers. The body 48' of the aspirator has, radially or tangentially, an outlet 22 which discharges the fibers carried away either in front of the feed cylinder 4 or above the point of aspiration as shown in dotted lines 22', in order to return them to the machine. The body of the apparatus is provided with a supporting lug 13 through which passes a supporting rod 14 arranged parallel to the axis of the carding cylinder 6, the rod 14 being mounted in supports 15 above the benches of the carding engine and having a double thread cooperating with a correspondingly threaded element in the supporting lug 13 of the apparatus, so that on rotation of said rod the motor and the parts carried thereby are displaced in one or the other direction along said rod. This rod 14 is driven by a pulley 16 which may be combined with a speed reducer 17. The electric motor 50 is connected in any suitable manner with a fixed point of current supply located preferably on one of the benches of the carding engine. If desired, there may be combined therewith automatic switches, in such manner that the electric circuit is opened and closed in convenient intervals.

Such a switch is diagrammatically shown, by way of example, in the form of an interrupter 18, secured to a rod 19, which is provided with levers 20, 20' actuated by the motor casing 50. When the aspirator has traveled to one end of the carding cylinder, the motor housing actuates one of the levers interrupting the circuit for the motor and, therefore, the supply of suction; when the aspirator arrives at the other end, the circuit is again closed by actuating the other lever. In this way, suction will be supplied only in one direction of the travel of the aspirator. In such case of interrupted suction, care has to be taken that the revolving speed of the carding cylinder and the variations of the suction cycle are so adjusted that removal and return of the fibers is applied to the same generatrices, as illustrated by Fig. 6.

The apparatus of Fig. 13 is distinguished from the apparatus of Fig. 10 mainly by the construction of the collector. The figure shows the conventional parts of a cotton card, i. e. the card clothing 11 of the main carding cylinder 6, the feed table 57, the feed cylinder 56 and the licker-in 5. The curve of the flats is shown at 7, 10 is the cover of the main cylinder and 55 that of the licker-in.

The collector consists of a suction chamber 58, which communicates constantly through the conduit 58' with a source of vacuum, which may, or may not, be individual for each card. The suction chamber 58 extends over the whole width of the card and communicates through a perforated drum 30 and/or a belt or apron 30' with a casing 59 which terminates in a flat nozzle 60 also extending over the whole width of the card. This nozzle 60 would act, through slot 40, on the whole width of the card clothing if there would not be interposed between the nozzle and the card clothing an endless traveling belt or apron 23. The belt or apron 23 is provided with suitable perforations which ensure that suction is successively applied to small elements of the card clothing in all generatrices while the carding cylinder revolves.

The fibers removed by suction are deposited on the revolving drum 30 or apron 30' which acts as a traveling screen therefor and which expels them from the casing 59; 25' is an endless traveling belt coacting with the endless belt 30' to carry between them the fibers out of the casing 59 to a convenient point where they are discharged into the picker lap prior to its absorption by the feed cylinder.

The belt 30' is driven by the drum 30 and/or the roller 26, and the belt 25' by the rollers 25 and/or 27. It will be noted that the belts may be omitted, in which case the fibers will be expelled from the casing 59 by coaction of the drum 30 with a pressure roller 25.

This device allows of continuous or intermittent operation, depending on the disposition of the perforations of the belt 23. In an intermittent process, the movement of the belts 30' and 25 has to be so adjusted as to insure that the fibers carried by these belts are returned during a single revolution of the carding cylinder substantially to generatrices of the card clothing from which fillers have been removed or will be removed—in the same revolution by the suction intermittently applied through the belt 23.

The manner how suction can be continually applied to limited areas of the card clothing will be readily understood upon inspection of Figs. 14 to 16. The endless traveling belt 23 is provided with two parallel slanting slots, 35—36 and 37—38, as seen in the developments of the belt in Figs. 15 and 15a. Fig. 15 is a development of the upper run 23a of Fig. 14, and Fig. 15a is a similar development of the lower run 23b, both viewed from the carding cylinder side. The belt is driven by rolls 21 and its two superposed runs are pressed upon each other by means of the rolls 24. When traveling around the rolls 21, the two slots cross each other and move in opposite directions; in this way, the two crossed slots form along the center line of the nozzle 60, a small opening 31 running to and fro over the whole width of the revolving carding cylinder, as indicated by the dotted lines.

Fig. 16 is a plan view of the superposed runs 23a and 23b of the belt whereon a larger part of the upper run is broken away to show the position of the slots in both runs. The arrows indicate the direction of travel; 35'—36' is an element of the slot 35—36 in the upper run 23a and 37'—38' is an element of the slot 37—38 in the lower run 23b of the endless belt 23. Where the two slots cross, they form the opening 31. The line 34—34 is the center line of the angle formed by the two slots, and when the point 33 of the slot 37—38 reaches the center line 34—34, it will meet the point 32 of the slot 35—36, which has traveled a distance defined by the arrow 32—31' equal to the distance defined by the arrow 33—31', and the slots form the opening 31'. The slotted traveling belt, therefore, produces continuously a suction opening which travels along the center line 34—34.

If more slots are arranged, one or more traveling suction points can be produced dependent on the location of the slots.

The amount of suction supplied in the arrangement of my invention is self-controlled because the removed fibers are deposited on the drum or an equivalent apron—which constitutes actually a kind of traveling screen through which the suction is applied—and close the apertures of such screen the tighter the larger their amount is. In other words, the fibers on the screen form an air filter which reduces the suction transmitted through the apertures of the screen in proportion to the thickness of the deposited fiber mass. Therefore, the vacuum applied will increase when the amount of removed fibers decreases, and vice versa. The result is that the amount or weight of fibers removed from the card clothing is substantially uniform per unit of time over the whole carding time. These continuously removed fibers are, wholly or partially, returned to the carding machine and preferably distributed uniformly over the whole width of the card clothing, either directly or by means of a new passage over the feed-cylinder and licker-in. In this way, a continuous line of constant over-charge, extending over the generatrices of the carding cylinder is obtained, as indicated by the line MNOPQ . . . in Fig. 5. This line conforms, and is similar, to the line ABCD produced by the suction. The distance NB indicates the time interval between fiber removal and fiber return to the same cylindrical element, which may be varied according to the desired requirements.

Assuming that the main cylinder has traveled in the unit of time a distance $tu$ (Fig. 5) equal to $vx$, it will be noted that in the first case the fibers to be carded are composed as follows: the uniform lap of fibers delivered during the time interval minus the fibers corresponding to the area $h$ removed prior to the action of the flats plus the fibers additionally charged to the area $j$, which fibers have been recycled. For the same unit of time, at another time $vx$, it will be noted that the amount of fibers to be treated is exactly the same as for $tu$, the amounts $k$ and $i$ being equal to $j$ and $h$, respectively. This shows that the amount of fibers treated per unit of time is constant, which results in the production of perfectly uniform and constant sliver, a result never obtained before, while at the same time, the card clothing is kept clean for long periods of time.

Comparative tests on a typical cotton card of a width of 45" were made, feeding an average of 5.25 kg. per hour of a fiber stock consisting of a mixture of 50% Brazil cotton of 5/8" and 50% of India cotton of 15/16". In the first test, conventional intermittent stripping was used, and in the second test an apparatus according to Fig. 10 of the drawings. The traveling speed of this apparatus was so adjusted that the nozzle took 2 min. 26 sec. to move from one end of the carding cylinder to the other end. During each of said cycles 6.32 grams of cotton were recycled.

The following table shows the average number of the obtained sliver after runs of three hours, after which time the carding machines operated according to the conventional process had become clogged. The figures are averages obtained in duplicate tests on 5 carding machines.

Table 1

|  | Conventional Carding Operation | Method of Invention |
|---|---|---|
| Number of sliver at start of the carding operation | 17.59 | 17.23 |
| Number of sliver after 3 hours of the carding operation | 16.19 | 17.13 |
| Variation in the number during the carding operation | 1.40 | .1 |

Table 1 shows that the variation in the number of the sliver amounts to over 8% in the conventional carding operation and approximately the same variation takes place in the weight of the sliver produced by the carding machine within the same length of time.

This variation corresponds to the relation $$\frac{MB}{bB}$$

of Figs. 1 and 3 and is about .08. When the method of this invention is used, the variation in the number of sliver is 0.5% and the variation in the weight in the same length of time about .005, i. e. for practical purposes it remains uniform.

As stated hereinbefore, an excellent measure for the good performance of a carding machine is furnished by the count of the "white points" appearing per unit of the surface of the produced web. These white points represent small tufts of fibers which have not been opened during carding. It is impossible to eliminate such tufts in any subsequent operation and they are therefore incorporated in the finished yarn, where they affect the appearance and are liable to produce breaks in the final processing of the yarn and in subsequent textile processes.

Table 2

|  | Average Number of "white points" | |
|---|---|---|
|  | Conventional Carding Operation | Method of Invention |
| Web at the start of the carding operation immediately after stripping | 37 | 37 |
| Web after 3 hours of continuous carding operation | 62 | 39 |
| Increase percent | 63 | 5 |

The "white points" were counted by spreading samples of the web of the size 11½ x 8" on cardboard covered with black velvet. Table 2 shows that in the new carding method the increase in the number of "white points" after 3 hours of carding is only about 8% of that found in the usual carding operation.

Another set of tests, under the same conditions as defined hereinbefore, was made to determine the waste in a conventional carding operation and in the method according to this invention.

*Table 3*

|  | Conventional Carding Operation | Method of Invention |
|---|---|---|
|  | *Percent* | *Percent* |
| Waste from the flats | 2.42 | 2.20 |
| Waste from the under side of the cylinder | 1.44 | 1.47 |
| Waste in form of the strippings from the main carding cylinder | .87 | .073 |
| Waste in form of strippings from the doffer | .07 | .06 |
| Total waste | 4.80 | 3.803 |

Table 3 shows that in the carding method according to the invention, the waste is reduced by 20% and that 1% more of the cotton fed into the carding machine is converted into the sliver which itself is of better quality than that obtained by the conventional carding operation.

Other savings accomplished by the method of this invention will be readily undertsood when taking into account that in a conventional carding machine the carding operation has to be stopped for stripping about every 3 hours for about 2 minutes, and that, after resuming the carding operation, it takes about 3 minutes until some normal sliver is attained. This means a loss of 2.8% of the time during which the carding machine is in operation.

The improved working conditions introduced in the carding operation by the new method allow an increase of the speed of the various machine elements and the weight of the cotton fed to the machine, while obtaining a sliver of improved quality. By introducing the method of this invention into practice, it has been possible to increase the productive capacity of the carding machines by about 20%.

These improved results are independent of the theoretical consideration which has been presented hereinbefore in an attempt of an examination and a better understanding of the involved problems, and it is to be understood that my invention shall not be limited by such explanation nor to the details above described but is to be considered as broad and as limited only by the scope of the claims appended hereto.

The term "generatrix" as used in the specification and claims is understood to designate any straight line on the cylinder, or the cylindrical area enclosed between two such closely adjoining straight lines, on the surface of the carding cylinder which are parallel to its axis; more accurately, it is any line comprising all the points of said surface which in the travel of the web of fibers combine with each other to form a straight section of the produced sliver.

What I claim is:

1. A method of improving the carding effect of carding cylinders which comprises the steps of applying suction to the web of fibers being carded on the carding cylinders, such suction being continually shifted across the surface of the cylinder as said cylinder rotates, continually returning the fibers carried away by said suction to the web of fibers, and distributing said returned fibers over the surface of said web, while it travels to the flats, in a rhythm and pattern conforming to the shifting of the suction across the surface of the carding cylinder.

2. A method of improving the carding effect of carding cylinders which comprises the step of applying suction to the web of fibers being carried on the carding cylinders, such suction being applied progressively back and forth across the surface of the cylinder as said cylinder rotates and of continuously returning fibers carried away by said suction to said web of fibers to compensate spaces where fibers are withdrawn.

3. A method as claimed in claim 2, wherein the fibers carried away by the suction are returned to the lap of fibers being fed into the carding machine.

4. A method of improving the carding effect of carding machines comprising the steps of withdrawing by suction fibers from different elements of the card clothing, returning at least part of the withdrawn fibers to the tips of the teeth of the card clothing, and adjusting said withdrawals and returns so that all generatrices deliver substantially the same amount of fibers.

5. A method of improving the carding effect of carding machines comprising the steps of withdrawing uniform amounts of fibers by suction from an helical track extending across the surface of the carding cylinder and of adding uniform amounts of fibers, also along an helical path extending across said surface.

6. In a carding machine in combination with the carding cylinder, a doffer cylinder, a licker-in, pneumatic means to remove fibers from limited areas of the card clothing of at least one of said cylinders, means for recycling the removed fibers, means for redistributing them onto the web of fibers, and means for simultaneously shifting said areas of fiber removal and fiber redistribution back and forth across the surface of the web of fibers.

7. In a carding machine in combination with the carding cylinder, a doffer cylinder, a licker-in, pneumatic means to remove fibers from limited areas of the card clothing of at least one of said cylinders, means for recycling the removed fibers, means for redistributing them onto the web of fibers, and means for simultaneously and continuously reciprocating said means for fiber removal and fiber redistribution across the surface of the web of fibers.

8. A carding machine as claimed in claim 7 wherein the means for redistributing the fibers are located above and in front of the licker-in.

9. A carding machine as claimed in claim 7 comprising means for separating dust from the fibers before they are redistributed onto the web of fibers.

10. In a carding machine a source of vacuum, a rod mounted lengthwise of the carding cylinder above the licker-in, a casing mounted on said rod, a suction chamber in said casing communicating with said source of vacuum, a nozzle at one end of said casing in close proximity to the card clothing adapted to remove fibers from the carding cylinder into said suction chamber, an outlet in said casing adapted to eject said fibers in front of the feed cylinder, means in said casing for collecting the fibers and carrying them towards the outlet, and means for reciprocating said casing along said rod.

11. A carding machine as claimed in claim 10, comprising a stationary vacuum pump associated with the carding machine and a flexible conduit supplying vacuum from said vacuum pump to the suction chamber in said casing.

12. In a carding machine, a source of vacuum, a casing mounted lengthwise of the carding cylinder, a suction chamber in said casing communicating with said source of vacuum, a nozzle at one end of said casing extending over the whole width of the carding cylinder in proximity to the card clothing and adapted to remove fibers from the carding cylinder into said casing, means located between said nozzle and the card clothing for shifting the suction successively over small areas of the card clothing, an outlet in said casing extending lengthwise of the carding cylinder, and means in the said casing for collecting the fibers and carrying them towards the outlet so as to eject said collected fibers through said outlet onto the web of fibers.

13. A carding machine as claimed in claim 12 wherein said shifting means comprises an endless belt of which both runs travel one above the other between the nozzle and the carding cylinder, the width of said belt being approximately the same as the length of the nozzle, and two slots in said belt adapted to uncover on superposition during the travel of the belt small areas of the card clothing.

14. An apparatus for improving the carding effect of carding machines, which comprises an electro-aspirator for mounting at the rear part of the carding engine above the cover of the licker-in and in the space between the latter and the curve formed by the flats, which electro-aspirator comprises an electro-motor, a casing, an aspirator mounted coaxially with said motor in said casing, a tubular element which extends coaxially from said casing to enter an aperture therefor in the cover of the carding cylinder, an aspirator mouth-piece at the end of said tubular element, and an outlet conduit from said casing so arranged as to discharge and distribute the strippings in front of the feed cylinder, such mouth-piece and outlet forming the ends of a closed passage for continuously returning the strippings during the carding operation to the lap material traveling to the licker-in.

15. An apparatus as claimed in claim 14, comprising a tubular strip on the upper part of said electro-motor, a supporting rod which passes through said strip and lies parallel to the axis of the carding cylinder, and means for reciprocating said electro-aspirator along said rod while the fibers are fed to the carding cylinder.

16. An apparatus as claimed in claim 15 wherein said rod and said tubular strip on the electro-motor are provided with co-operating screw threads causing the electro-aspirator to be moved in either direction along said rod, and means are provided for rotating said rod to effect displacement of the electro-aspirator along the rod.

17. An apparatus as claimed in claim 14 comprising means for automatically starting and stopping said electric motor for interrupting the operation of the electro-aspirator in predetermined time intervals.

18. In a carding machine, a source of vacuum, a casing mounted lengthwise of the carding cylinder, a suction chamber in said casing communicating with said source of vacuum, a nozzle at one end of said casing extending over the whole width of the carding cylinder in proximity to the card clothing and adapted to remove fibers from the carding cylinder into said casing, an outlet in said casing extending lengthwise of the carding cylinder, and means in the said casing for collecting the fibers and carrying them towards the outlet so as to eject said collected fibers through said outlet onto the web of fibers.

19. In a carding cylinder of a textile machine pneumatic means to remove fibers from the card clothing of said cylinder, means for collecting said fibers, means for reallocating at least a part of said collected fibers to the card clothing to compensate for the removals, and a traveling belt for conveying removed fibers from said collecting means to said reallocating means.

AGUSTIN MASALLERA CASTELL.

REFERENCES CITED

The following references are of record in the file of this patent:

UNITED STATES PATENTS

| Number | Name | Date |
| --- | --- | --- |
| 1,079,392 | Campbell | Nov. 25, 1913 |
| 1,642,758 | Wilkinson et al. | Sept. 20, 1927 |
| 1,732,860 | Rooney | Oct. 22, 1929 |
| 2,327,349 | Goldsmith, Jr. | Aug. 2, 1943 |
| 2,433,810 | Clark | Dec. 30, 1947 |